US009225545B2

(12) United States Patent
Archer et al.

(10) Patent No.: US 9,225,545 B2
(45) Date of Patent: *Dec. 29, 2015

(54) DETERMINING A PATH FOR NETWORK TRAFFIC BETWEEN NODES IN A PARALLEL COMPUTER

(75) Inventors: Charles J. Archer, Rochester, MN (US); Amanda Peters, Rochester, MN (US); Brian E. Smith, Rochester, MN (US); Brent A. Swartz, Chippewa Falls, WI (US)

(73) Assignee: International Business Machines Corporation, Armonk, NY (US)

( * ) Notice: Subject to any disclaimer, the term of this patent is extended or adjusted under 35 U.S.C. 154(b) by 1993 days.

This patent is subject to a terminal disclaimer.

(21) Appl. No.: 12/060,508

(22) Filed: Apr. 1, 2008

(65) Prior Publication Data
US 2009/0248894 A1     Oct. 1, 2009

(51) Int. Cl.
G06F 15/173     (2006.01)
H04L 12/413    (2006.01)

(52) U.S. Cl.
CPC .................... *H04L 12/413* (2013.01)

(58) Field of Classification Search
CPC .................................................. H04L 12/413
See application file for complete search history.

(56) References Cited

U.S. PATENT DOCUMENTS

| 4,933,846 | A | 6/1990 | Humphrey et al. |
| 5,050,162 | A | 9/1991 | Golestani |
| 5,083,265 | A | 1/1992 | Valiant |
| 5,136,582 | A | 8/1992 | Firoozmand |
| 5,193,179 | A | 3/1993 | Laprade et al. |
| 5,218,676 | A | 6/1993 | Ben-Ayed et al. |
| 5,319,638 | A | 6/1994 | Lin |
| 5,347,450 | A | 9/1994 | Nugent |
| 5,437,042 | A | 7/1995 | Culley et al. |
| 5,448,698 | A | 9/1995 | Wilkes |
| 5,453,978 | A | 9/1995 | Sethu et al. |
| 5,617,537 | A | 4/1997 | Yamada et al. |
| 5,680,116 | A | 10/1997 | Hashimoto et al. |
| 5,689,509 | A | 11/1997 | Gaytan et al. |
| 5,721,921 | A | 2/1998 | Kessler et al. |
| 5,758,075 | A | 5/1998 | Graziano et al. |
| 5,781,775 | A | 7/1998 | Ueno |
| 5,790,530 | A | 8/1998 | Moh et al. |
| 5,796,735 | A | 8/1998 | Miller et al. |
| 5,802,366 | A | 9/1998 | Row et al. |
| 5,835,482 | A | 11/1998 | Allen |

(Continued)

OTHER PUBLICATIONS

Almasi, et al., "Architecture and Performance of the BlueGene/L Message Layer", IBM Thomas J. Watson Research Center (2004), Sections 1-7.*

(Continued)

*Primary Examiner* — Suraj Joshi
(74) *Attorney, Agent, or Firm* — Edward J. Lenart; James R. Nock; Kennedy Lenart Spraggins LLP

(57) ABSTRACT

Determining a path for network traffic between a source compute node and a destination compute node in a parallel computer including identifying a group of compute nodes, the group of compute nodes having topological network locations included in a predefined topological shape; selecting, from the predefined topological shape, in dependence upon a global contention counter stored on the source compute node, a path on which to send a data communications message from the source compute node to the destination compute node; and sending, by the messaging module of the source compute node, the data communications message along the selected path for network traffic between the source and destination compute nodes.

20 Claims, 7 Drawing Sheets

(56) References Cited

U.S. PATENT DOCUMENTS

| | | | |
|---|---|---|---|
| 5,928,351 | A | 7/1999 | Horie et al. |
| 5,933,425 | A | 8/1999 | Iwata |
| 5,959,995 | A | 9/1999 | Wicki et al. |
| 5,961,659 | A | 10/1999 | Benner |
| 5,995,503 | A | 11/1999 | Crawley et al. |
| 6,081,506 | A | 6/2000 | Buyukkoc et al. |
| 6,085,303 | A | 7/2000 | Thorson et al. |
| 6,105,122 | A | 8/2000 | Muller et al. |
| 6,161,198 | A | 12/2000 | Hill et al. |
| 6,356,951 | B1 | 3/2002 | Gentry, Jr. |
| 6,486,983 | B1 | 11/2002 | Beshai et al. |
| 6,711,632 | B1 | 3/2004 | Chow et al. |
| 6,735,662 | B1 | 5/2004 | Connor |
| 6,744,765 | B1 | 6/2004 | Dearth et al. |
| 6,748,413 | B1 | 6/2004 | Bournas |
| 6,754,732 | B1 | 6/2004 | Dixon et al. |
| 6,857,030 | B2 | 2/2005 | Webber |
| 6,901,052 | B2 | 5/2005 | Buskirk et al. |
| 6,977,894 | B1 | 12/2005 | Achilles et al. |
| 6,981,074 | B2 | 12/2005 | Oner et al. |
| 7,031,305 | B1 | 4/2006 | Yu et al. |
| 7,111,092 | B1 | 9/2006 | Mitten et al. |
| 7,155,541 | B2 | 12/2006 | Ganapathy et al. |
| 7,319,695 | B1 | 1/2008 | Agarwal et al. |
| 7,406,086 | B2 | 7/2008 | Deneroff et al. |
| 7,552,312 | B2 | 6/2009 | Archer et al. |
| 7,805,546 | B2 | 9/2010 | Archer et al. |
| 7,827,024 | B2 | 11/2010 | Archer et al. |
| 7,836,143 | B2 | 11/2010 | Blocksome et al. |
| 7,890,670 | B2 | 2/2011 | Archer et al. |
| 2002/0044533 | A1 | 4/2002 | Bahl et al. |
| 2003/0128687 | A1* | 7/2003 | Worfolk et al. ............... 370/351 |
| 2004/0001508 | A1 | 1/2004 | Zheng et al. |
| 2004/0057380 | A1 | 3/2004 | Biran et al. |
| 2004/0078405 | A1 | 4/2004 | Bhanot et al. |
| 2004/0218631 | A1 | 11/2004 | Ganfield |
| 2005/0002334 | A1 | 1/2005 | Chao et al. |
| 2005/0018682 | A1 | 1/2005 | Ferguson et al. |
| 2005/0068946 | A1 | 3/2005 | Beshai |
| 2005/0076104 | A1 | 4/2005 | Liskov et al. |
| 2005/0078669 | A1 | 4/2005 | Oner |
| 2005/0100035 | A1 | 5/2005 | Chiou et al. |
| 2005/0108425 | A1 | 5/2005 | Rabinovitch |
| 2005/0213570 | A1 | 9/2005 | Stacy et al. |
| 2006/0002424 | A1 | 1/2006 | Gadde |
| 2006/0161733 | A1 | 7/2006 | Beckett et al. |
| 2006/0190640 | A1 | 8/2006 | Yoda et al. |
| 2006/0195336 | A1 | 8/2006 | Greven et al. |
| 2006/0206635 | A1 | 9/2006 | Alexander et al. |
| 2006/0218429 | A1 | 9/2006 | Sherwin et al. |
| 2006/0230119 | A1 | 10/2006 | Hausauer et al. |
| 2006/0253619 | A1 | 11/2006 | Torudbakken et al. |
| 2007/0070909 | A1* | 3/2007 | Reeve ............................ 370/238 |
| 2007/0165672 | A1 | 7/2007 | Keels et al. |
| 2007/0198519 | A1 | 8/2007 | Dice et al. |
| 2008/0016249 | A1 | 1/2008 | Ellis et al. |
| 2008/0101295 | A1 | 5/2008 | Tomita et al. |
| 2008/0222317 | A1 | 9/2008 | Go et al. |
| 2008/0273543 | A1 | 11/2008 | Blocksome et al. |
| 2009/0006808 | A1 | 1/2009 | Blumrich et al. |
| 2009/0019190 | A1 | 1/2009 | Blocksome |
| 2009/0031001 | A1 | 1/2009 | Archer et al. |
| 2009/0031002 | A1 | 1/2009 | Blocksome |
| 2009/0154486 | A1 | 6/2009 | Archer et al. |
| 2009/0248894 | A1 | 10/2009 | Archer et al. |
| 2009/0248895 | A1 | 10/2009 | Archer et al. |
| 2010/0082848 | A1 | 4/2010 | Blocksome et al. |

OTHER PUBLICATIONS

Moreira, et al.; The Blue Gene/L Supercomputer: A Hardware and Software Story; International Journal of Parallel Programming; Jun. 2007; pp. 181-206; vol. 35, No. 3, Springer Science+Business Media LLC.; USA.
Notice of Allowance, U.S. Appl. No. 11/754,719, filed Apr. 6, 2010.
Office Action, U.S. Appl. No. 11/744,319, filed May 12, 2010.
Office Action, U.S. Appl. No. 11/829,317, filed May 26, 2010.
Final Office Action, U.S. Appl. No. 11/746,348, filed Feb. 23, 2010.
Notice of Allowance, U.S. Appl. No. 11/758,167, filed Mar. 12, 2010.
Office Action, U.S. Appl. No. 11/754,719, filed Oct. 14, 2008.
Office Action, U.S. Appl. No. 11/754,719, filed Mar. 4, 2009.
Office Action, U.S. Appl. No. 11/758,167, filed Nov. 21, 2008.
Office Action, U.S. Appl. No. 11/744,296, filed Aug. 20, 2009.
Office Action, U.S. Appl. No. 11/746,348, filed Sep. 2, 2009.
Final Office Action, U.S. Appl. No. 11/758,167, filed Apr. 24, 2009.
Final Office Action, U.S. Appl. No. 11/754,719, filed Aug. 5, 2009.
Final Office Action, U.S. Appl. No. 11/744,296, filed Feb. 24, 2010.
Notice of Allowance, U.S. Appl. No. 11/746,348, filed Oct. 5, 2010.
Ron Brightwell, Keith D. Underwood, "An Analysis of NIC Resource Usage for Offloading MPI," ipdps, vol. 9, pp. 183a, 18th International Parallel and Distributed Processing Symposium (IPDPS'04)—Workshop 8, 2004.
Keith D. Underwood, Ron Brightwell, "The Impact of MPI Queue Usage on Message Latency," icpp, pp. 152-160, 2004 International Conference on Parallel Processing (ICPP'04), 2004.
Keith D. Underwood, K. Scott Hemmert, Arun Rodrigues, Richard Murphy, Ron Brightwell, "A Hardware Acceleration Unit for MPI Queue Processing," ipdps, vol. 1, pp. 96b, 19th IEEE International Parallel and Distributed Processing Symposium (IPDPS'05)—Papers, 2005.
U.S. Appl. No. 11/776,707, filed Jul. 12, 2007, Blocksome.
U.S. Appl. No. 11/739,948, filed Apr. 25, 2007, Blocksome, et al.
U.S. Appl. No. 11/740,361, filed Apr. 26, 2007, Archer, et al.
U.S. Appl. No. 11/746,333, filed May 9, 2007, Archer, et al.
U.S. Appl. No. 11/754,765, filed May 29, 2007, Archer, et al.
U.S. Appl. No. 11/764,302, filed Jun. 18, 2007, Archer, et al.
U.S. Appl. No. 11/755,501, filed May 30, 2007, Archer, et al.
U.S. Appl. No. 11/829,325, filed Jul. 27, 2007, Archer, et al.
U.S. Appl. No. 11/829,334, filed Jul. 27, 2007, Archer, et al.
U.S. Appl. No. 11/776,718, filed Jul. 12, 2007, Blocksome.
U.S. Appl. No. 11/829,339, filed Jul. 27, 2007, Blocksome.
Watson, Robert, "DMA Controller Programming in C," C Users Journal, v11n11, Nov. 1993, p. 35-50.
Office Action Dated May 26, 2009 in U.S. Appl. No. 11/829,325.
Office Action Dated Aug. 27, 2009 in U.S. Appl. No. 11/739,948.
Office Action Dated Sep. 1, 2009 in U.S. Appl. No. 11/776,718.
RCE, U.S. Appl. No. 11/740,361, filed Jan. 30, 2012.
Notice of Allowance, U.S. Appl. No. 11/755,501, filed Jun. 9, 2011.
Final Office Action, U.S. Appl. No. 11/776,718, filed Mar. 30, 2012.
Office Action, U.S. Appl. No. 12/702,661, filed Dec. 14, 2012.
Office Action, U.S. Appl. No. 12/956,903, filed Mar. 19, 2013.
Final Office Action, U.S. Appl. No. 11/740,361, filed Sep. 29, 2011.
Office Action, U.S. Appl. No. 11/776,718, filed Oct. 19, 2011.
Watson, R., "DMA controller programming in C," C Users Journal, Nov. 1993, pp. 35-50 (10 Total pages), v11 n11, R & D Publications, Inc., Lawrence, KS, USA. ISSN: 0898-9788.
Notice of Allowance, U.S. Appl. No. 12/702,661, filed May 15, 2013, pp. 1-9.
Notice of Allowance, U.S. Appl. No. 13/666,604, filed Sep. 25, 2013, pp. 1-10.
Office Action, U.S. Appl. No. 13/666,604, filed May 30, 2013, pp. 1-16.
Office Action, U.S. Appl. No. 13/676,700, filed Jun. 5, 2013, pp. 1-31.
Office Action, U.S. Appl. No. 13/671,055, filed Jul. 31, 2013, pp. 1-18.
Office Action, U.S. Appl. No. 13/769,715, filed Jul. 31, 2013, pp. 1-28.
Kumar et al., A Network on Chip Architecture and Design Methodology, IEEE Computer Society Annual Symposium on VLSI, 2002.
Final Office Action, U.S. Appl. No. 11/776,707, filed Jan. 6, 2011.
Final Office Action, U.S. Appl. No. 11/740,361, filed Oct. 4, 2010.
Office Action, U.S. Appl. No. 11/755,501, filed Nov. 26, 2010.
Ribler et al., "The Autopilot performance-directed adaptive control system", Sep. 1, 2001, pp. 175-187, vol. 18, No. 1, Elsevier Science Publishers, Elsevier Science Publishers B. V. Amsterdam, The Netherlands, The Netherlands, DOI: 10.1016/S0167-739X(01)00051-6.

(56) References Cited

OTHER PUBLICATIONS

Zhang et al., "Automatic Performance Tuning for J2EE Application Server Systems", Automatic Performance Tuning for J2EE Application Server Systems, Web Information Systems Engineering—Wise 2005, Proceedings. 6th International Conference on Web Information Systems Engineering, New York, NY, USA, Nov. 20-22, 2005, pp. 520-527, Springer Berlin Heidelberg, DOI: 10.1007/1158106243.

Chung et al., "Automated Cluster-Based Web Service Performance Tuning", Proceedings. 13th IEEE International Symposium on High Performance Distributed Computing (HPDC-13 '04), Jun. 4-6, 2004, pp. 36-44, IEEE Computer Society, CS Digital Library, ISBN: 0/7803-2175-4.

Hondroudakis et al., "An Empirically Derived Framework for Classifying Parallel Program Performance Tuning Problems", Proceeding. SPDT '98 Proceedings of the Sigmetrics symposium on Parallel and distributed Tools, Aug. 3-4, 1998, pp. 112-123, ACM, New York, NY, USA, DOI: 10.1145/281035.281047.

Gara et al., "Overview of the Blue Gene/L system architecture", IBM Journal of Research & Development, Mar. 2005, pp. 195-212, vol. 49, Issue: 2.3, IEEE Xplore Digital Library, DOI: 10.1147/rd.492.0195.

Adiga et al., "Blue Gene/L torus interconnection network", IBM Journal of Research & Development, Mar. 2005, pp. 265-276, vol. 49, Issue: 2, IBM Corp. Riverton, NJ, USA, ACM Digital Library, DOI: 10.1147/rd.492.0265.

Barnett et al., "Broadcasting on Meshes with Worm-Hole Routing", Second Revised Version, Dec. 1995, pp. 1-22, CiteSeerX (Online Publication), URL: http://webcache.googleusercontent.com/search?q=cache:Kkso1JLnAYwJ:citeseerx.ist.psu.edu/viewdoc/download%3Fdoi%3D10.1.1.50.5075%26rep%3Drep1%26type%3Dps+&cd=1&hl=en&ct=clnk&gl=us.

* cited by examiner

DETERMINING A PATH FOR NETWORK TRAFFIC BETWEEN NODES IN A PARALLEL COMPUTER

BACKGROUND OF THE INVENTION

1. Field of the Invention

The field of the invention is data processing, or, more specifically, methods, apparatus, and products for determining a path for network traffic between a source compute node and a destination compute node in a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are connected into a binary tree: each node has a parent, and two children (although some nodes may only have zero children or one child, depending on the hardware configuration). Although a tree network typically is inefficient in point to point communication, a tree network does provide high bandwidth and low latency for certain collective operations, message passing operations where all compute nodes participate simultaneously, such as, for example, an allgather operation. In computers that use a torus and a tree network, the two networks typically are implemented independently of one another, with separate routing circuits, separate physical links, and separate message buffers.

During execution of an application in a parallel computer, compute nodes connected according to a defined network topology may pass many data communications messages to other compute nodes in the network. Any delay in data communications increases inefficiency in executing the application. There currently exists several typical methods of routing data communications among compute nodes to reduce delay. Such methods typically rely on a predetermined set of routing rules or historical network congestion patterns to determine data communication routes among compute nodes. Rules and historical network congestion patterns, however, may not accurately reflect actual network congestion between nodes in the parallel computer and therefore may not reduce delay in data communications. Readers of skill in the art will recognize therefore that there exists a need to track network contention among compute nodes and use such tracked network contention to select paths for network traffic among the compute nodes.

SUMMARY OF THE INVENTION

Methods, apparatus, and products for determining a path for network traffic between a source compute node and a destination compute node in a parallel computer are described that include the source and destination compute nodes included in an operational group of compute nodes, the compute nodes connected for data communications in a point to point data communications network, each compute node connected in a network topology to an adjacent compute node in the point to point data communications network through a link, and: identifying, by a messaging module of the source compute node in dependence upon a topological network location of the source compute node, a topological network location of the destination compute node, and the network topology of the point to point data communications network, a group of compute nodes, the group of compute nodes including the source and destination compute nodes, the group of compute nodes having topological network locations included in a predefined topological shape, each compute node capable of receiving and forwarding network traffic thereby creating possible paths for network traffic between the source and destination compute nodes; selecting, from the predefined topological shape by the messaging module of the source compute node, in dependence upon a global contention counter stored on the source compute node, a path on which to send a data communications message from the source compute node to the destination compute node, the global contention counter representing network contention currently on all links among the compute nodes in the operational group; and sending, by the messaging module of the source compute node, the data communications message along the selected path for network traffic between the source and destination compute nodes.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
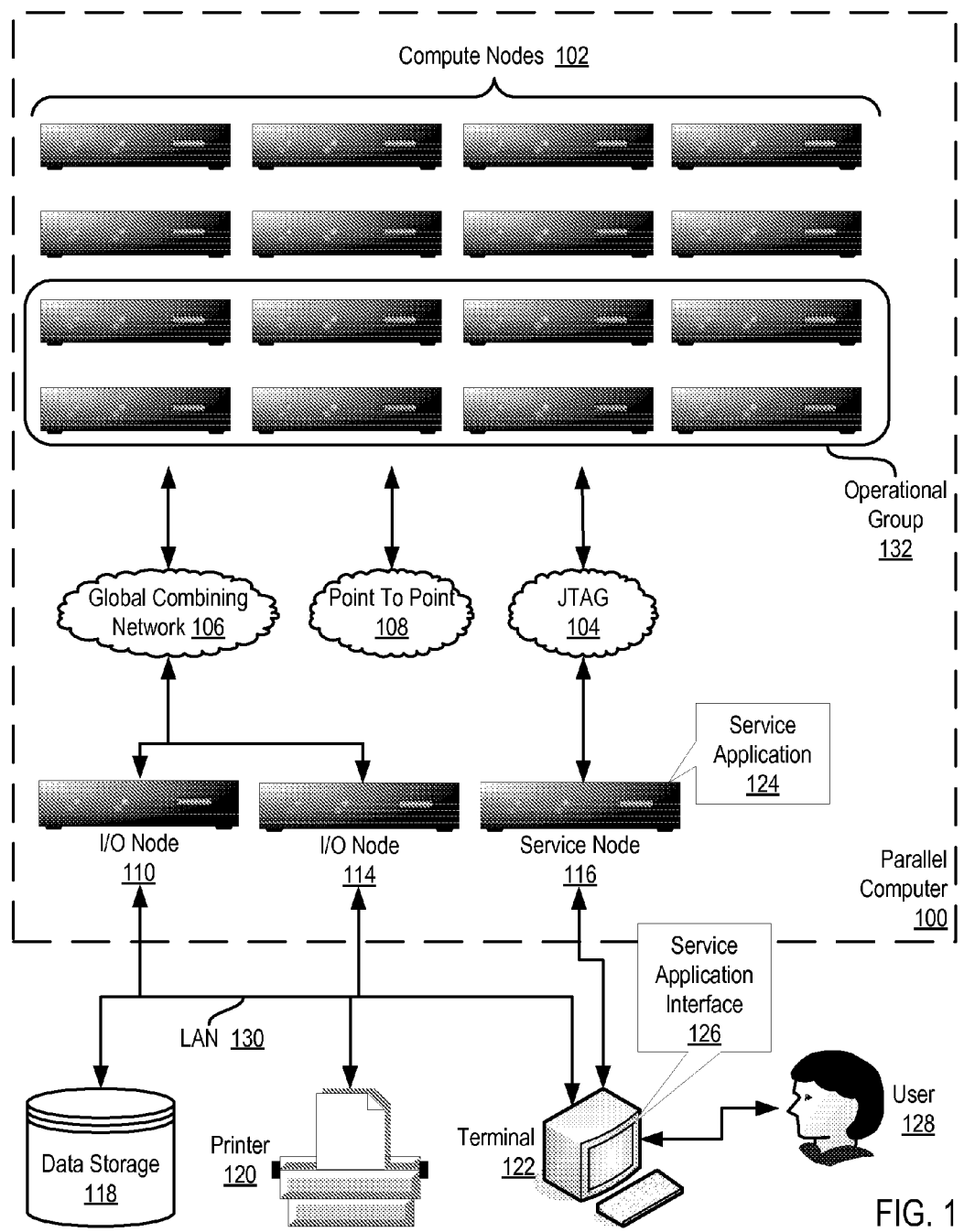
FIG. 1 illustrates an exemplary system for determining a path for network traffic between a source compute node and a destination compute node in a parallel computer according to embodiments of the present invention.

Exemplary methods, apparatus, and products for determining a path for network traffic between a source compute node and a destination compute node in a parallel computer in accordance with embodiments of the present invention are described with reference to the accompanying drawings, beginning with FIG. 1. FIG. 1 illustrates an exemplary system for determining a path for network traffic between a source compute node and a destination compute node in a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount * N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally for determining a path for network traffic between a source compute node and a destination compute node in a parallel computer according to embodiments of the present invention. A 'source compute node' as the term is used in this specification refers to a compute node (102) in the operational group (132) from which a data communications message to be transmitted via the point to point network (108) originates. A 'destination compute node' as the term is used in this specification refers to a compute node (102) in the operational group (132) that is the intended recipient or final destination of a data communications message originating from a source compute node and traversing the point to point network (108).

In the system of FIG. 1, each compute node is connected to an adjacent compute node in the point to point data communications network (108) through a link. Some links among the compute nodes in the point to point network (108) may have greater network contention at any given time than other links forming other paths. 'Network contention' as the term is used in this specification is congestion of data communications among nodes in a parallel computer. Congestion of data communications occurs because each compute node in the system of FIG. 1 includes a network buffer that stores data communications for transmission on a link to a neighboring compute node and data communications stored for transmission in a buffer are delayed until transmitted.

A 'path' as the term is used in this specification refers to aggregation of links and compute nodes through which a data communications message travels in the point to point network (108). Because network contention may differ among various links among the compute nodes (102) in the point to point network (108), a data communications message transmitted between a source and destination compute node may take different amounts of time to traverse different paths between the nodes.

The system of FIG. 1 operates generally for determining a path for network traffic between a source compute node and a destination compute node in a parallel computer according to embodiments of the present invention by identifying a group of compute nodes by a messaging module of the source compute node in dependence upon a topological network location of the source compute node, a topological network location of the destination compute node, and the network topology of the point to point data communications network (108). The identified group of compute nodes includes the source and destination compute nodes. Each of the compute nodes in the identified group of compute nodes has a topological network location included in a predefined topological shape and each compute node is capable of receiving and forwarding network traffic thereby creating possible paths for network traffic between the source and destination compute nodes.

In all embodiments of the present invention described in this specification no link in a path for network traffic between a source compute node and a destination compute node, hereafter referred to as the 'total path,' carries a data communications message 'away' from the destination compute node. That is, each link in the total path, and therefore the entire total path, leads toward the destination compute node. Moreover, it is assumed, for purposes of calculating network contention described in detail below, that data communications messages do not backtrack or travel across the same link more than once in any particular path.

The point to point network, as mentioned above, may be configured according to various network topologies, such as a torus. A network topology is generally a description of an arrangement or mapping of the elements, such as links and nodes, of a network, especially the physical and logical interconnections between nodes.

A predefined topological shape is a shape within the construct of a network topology comprising a group of compute nodes, the shape defined by locations of the compute nodes within the network topology and their connecting links. Consider first, as an example of a topological shape within a network topology, a network topology of a mesh network configured as a three dimensional grid in which all compute nodes have x,y,z locations within the network topology. Consider also a topological shape within the network topology of a three dimensional rectangular prism or a three dimensional pyramid in which each vertex of the shape is defined by a location of a compute node within the topology. Topological shapes may be used for various purposes, such as for example, identifying compute nodes located within the shape or located outside the shape and identifying paths within the shape or outside the shape. That is, a topological shape is typically used only with respect to what it contains or what is does not contain.

A topological shape as the term is used here is described as 'predefined' because a user typically sets the dimensions of such a shape. Consider again for explanation a topological shape of a rectangular prism in a three dimensional grid. A user may set the dimensions of the rectangular prism to three links long, by two links wide, by three links high. A user may also set a vertex of the shape to begin at a particular compute node, say a source compute node located at a 0,0,0. As an alternative to defining the edges of a shape, a user may also set the dimensions of a topological shape by setting a shape type, such a rectangular prism, and defining opposing vertices of the shape. A user may, for example, set the opposite vertices of a rectangular prism as the locations of a source compute node and a destination compute node within the topology.

After identifying a group of compute nodes within a predefined topological shape, the system of FIG. 1 also operates generally for determining a path for network traffic between a source compute node and a destination compute node in a parallel computer according to embodiments of the present invention by selecting a path on which to send a data communications message from the source compute node to the destination compute node and sending the data communications message along the selected path. Such a path may be selected from the predefined topological shape by the messaging module of the source compute node, a global contention counter stored on the source compute node. The global contention counter represents network contention currently on all links among the compute nodes in the operational group. That is, a global contention counter is a mathematical combination of all values of each element of all local contention counters in the operational group.

A local contention counter of a compute node represents network contention on links among the compute nodes originating from the compute node. A local contention counter may be defined as an array. Consider, for example, that the compute nodes in the system of FIG. 1 are configured in a torus network having locations defined by x,y,z coordinates as described above. In such a torus network a local contention counter for a compute node may be an array associating a link direction and a node location. That is, a local contention counter may defined as the following array:

LocalContentionCounter[{link_direction} {compute_node_location}]

In the example of a torus network, a link direction may be x+, x−, y+, y−, z+, and z−, represented in the local contention counter array as 0, 1, 2, 3, 4, and 5 respectively. A compute node at location 0,0,0 that transmits five packets to a compute node located at 3,0,0, on a route including only the x+axis, may have a local contention counter that includes the following elements, assuming no other packets have been transmitted by the node located at 0,0,0:

LocalContentionCounter[0,0,0,0]=5
LocalContentionCounter[0,1,0,0]=5
LocalContentionCounter[0,2,0,0]=5

Each of the elements of the above exemplary local contention counter represent packets transmitted on x+ links of compute nodes. The first element listed above represents that 5 packets are transmitted on the x+ link of the node located at 0,0,0. The second element listed above represents that 5 packets are transmitted on the x+ link of the node located at 1,0,0. The third element listed above represents that 5 packets are transmitted on the x+ link of the node located at 2,0,0. Although only three elements of a local contention counter are described here, readers of skill in the art will recognize that such an array may include an element for each link of each direction of each compute node in the operational group.

The arrangement of nodes, networks, and I/O devices making up the exemplary system illustrated in FIG. 1 are for explanation only, not for limitation of the present invention. Data processing systems capable of determining a path for network traffic between a source compute node and a destination compute node in a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of determining a path for network traffic between a source compute node and a destination compute node in a parallel computer according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Determining a path for network traffic between a source compute node and a destination compute node in a parallel computer according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of determining a path for network traffic between a source compute node and a destination compute node in a parallel computer according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Figure 2:
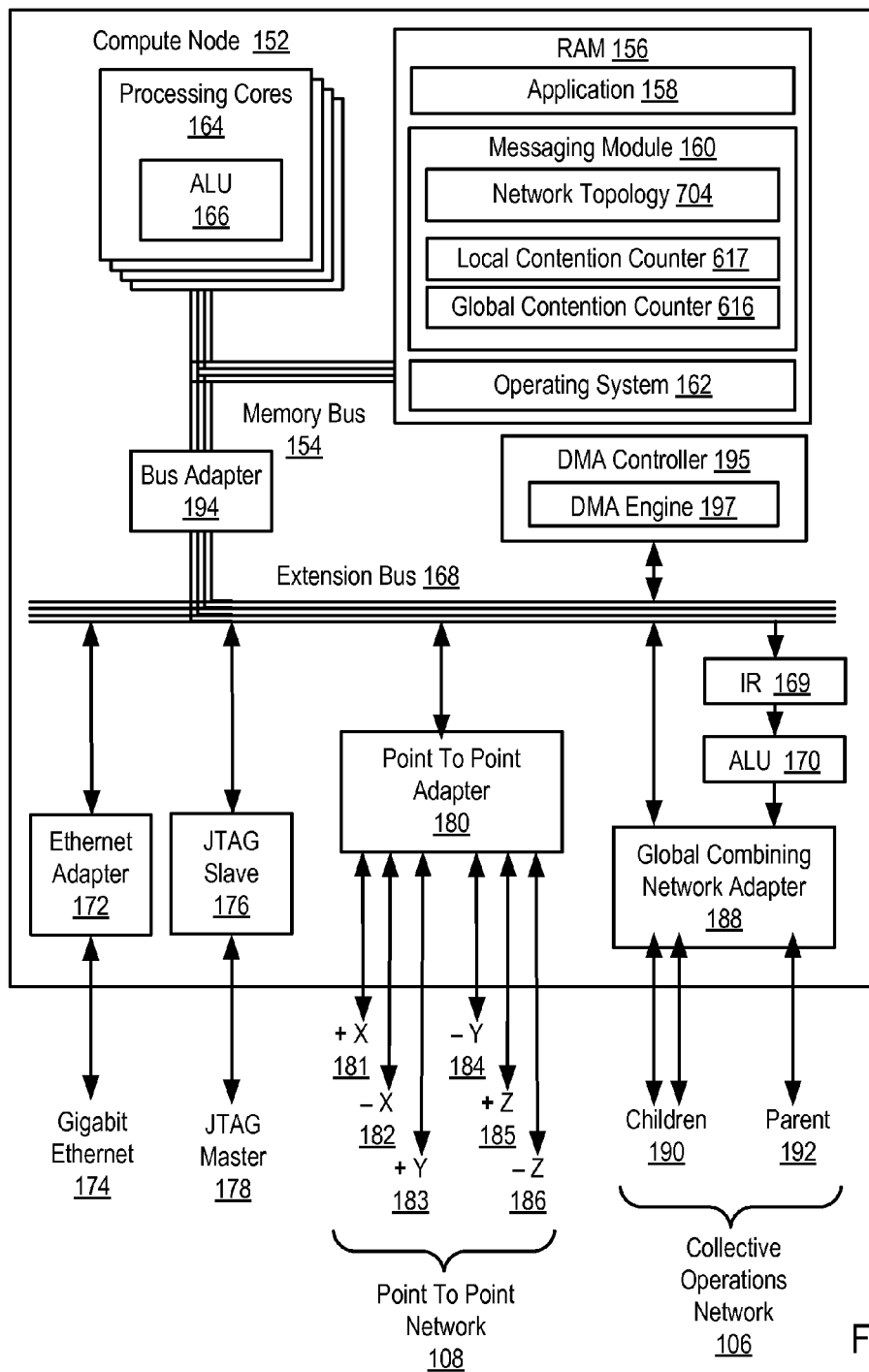
FIG. 2 sets forth a block diagram of an exemplary compute node useful in a parallel computer capable of determining a path for network traffic between a source compute node and a destination compute node in a parallel computer according to embodiments of the present invention.

The messaging module (160) of FIG. 2 has been adapted for determining a path for network traffic between a source compute node (152) and a destination compute node in a parallel computer in accordance with embodiments of the present invention. That is, the messaging module (160) in the example of FIG. 2 includes computer program instructions capable of identifying a group of compute nodes in dependence upon a topological network location of the source compute node (152), a topological network location of the destination compute node, and the network topology (704) of the point to point data communications network. The identified group of compute nodes includes the source and destination compute nodes and the identified group of compute nodes has topological network locations included in a predefined topological shape.

The exemplary messaging module (160) of FIG. 2 also includes computer program instructions capable of selecting, from the predefined topological shape, in dependence upon a global contention counter (616) stored on the source compute node (152), a path on which to send a data communications message from the source compute node (152) to the destination compute node. The exemplary global contention counter (616) of FIG. 2, derived from local contention counters (617) of all compute nodes in the operational, represents network contention currently on all links among the compute nodes in the operational group. The exemplary messaging module (160) of FIG. 2 also includes computer program instructions capable of sending the data communications message along the selected path for network traffic between the source and destination compute nodes.

Although determining a path for network traffic between a source compute node and a destination compute node in a parallel computer is described with respect to FIG. 2 as being carried out by a messaging module, readers of skill in the art will recognize that any module having computer program instructions capable of identifying a group of compute nodes, selecting a path on which to send a data communications message, and sending the data communications message along the selected path, as described herein, may carry out determining a path for network traffic between a source compute node and a destination compute node in a parallel computer, and each such module is well within the scope of the present invention.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for determining a path for network traffic between a source compute node and a destination compute node in a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in determining a path for network traffic between a source compute node and a destination compute node in a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. The DMA engine (197) of FIG. 2 is typically stored in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

Figure 3A:
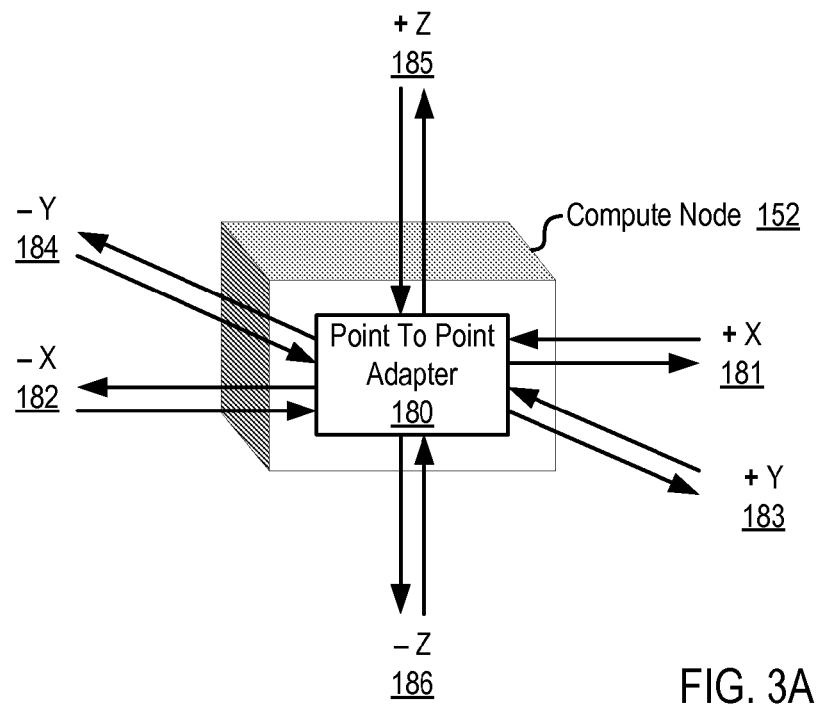
FIG. 3A illustrates an exemplary Point To Point Adapter useful in systems capable of determining a path for network traffic between a source compute node and a destination compute node in a parallel computer according to embodiments of the present invention.

For further explanation, FIG. 3A illustrates an exemplary Point To Point Adapter (180) useful in systems capable of determining a path for network traffic between a source compute node and a destination compute node in a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
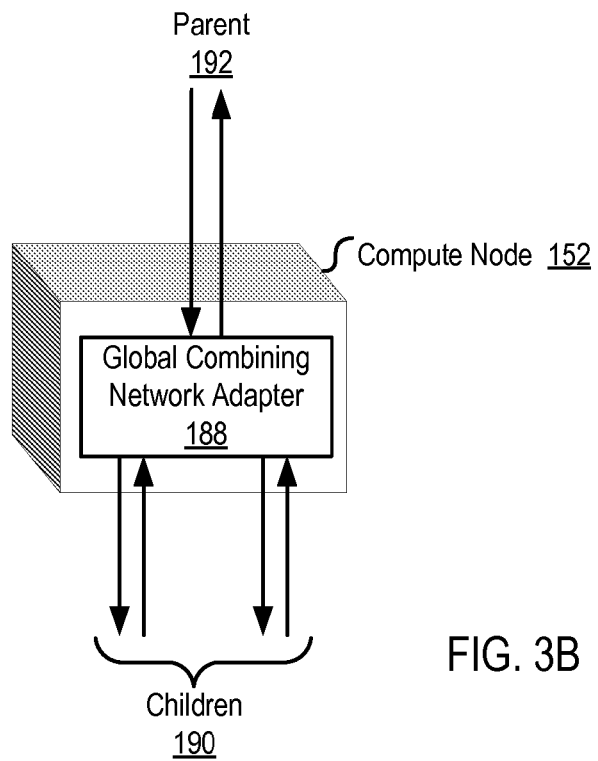
FIG. 3B illustrates an exemplary Global Combining Network Adapter useful in systems capable of determining a path for network traffic between a source compute node and a destination compute node in a parallel computer according to embodiments of the present invention.

For further explanation, FIG. 3B illustrates an exemplary Global Combining Network Adapter (188) useful in systems capable of determining a path for network traffic between a source compute node and a destination compute node in a parallel computer network according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
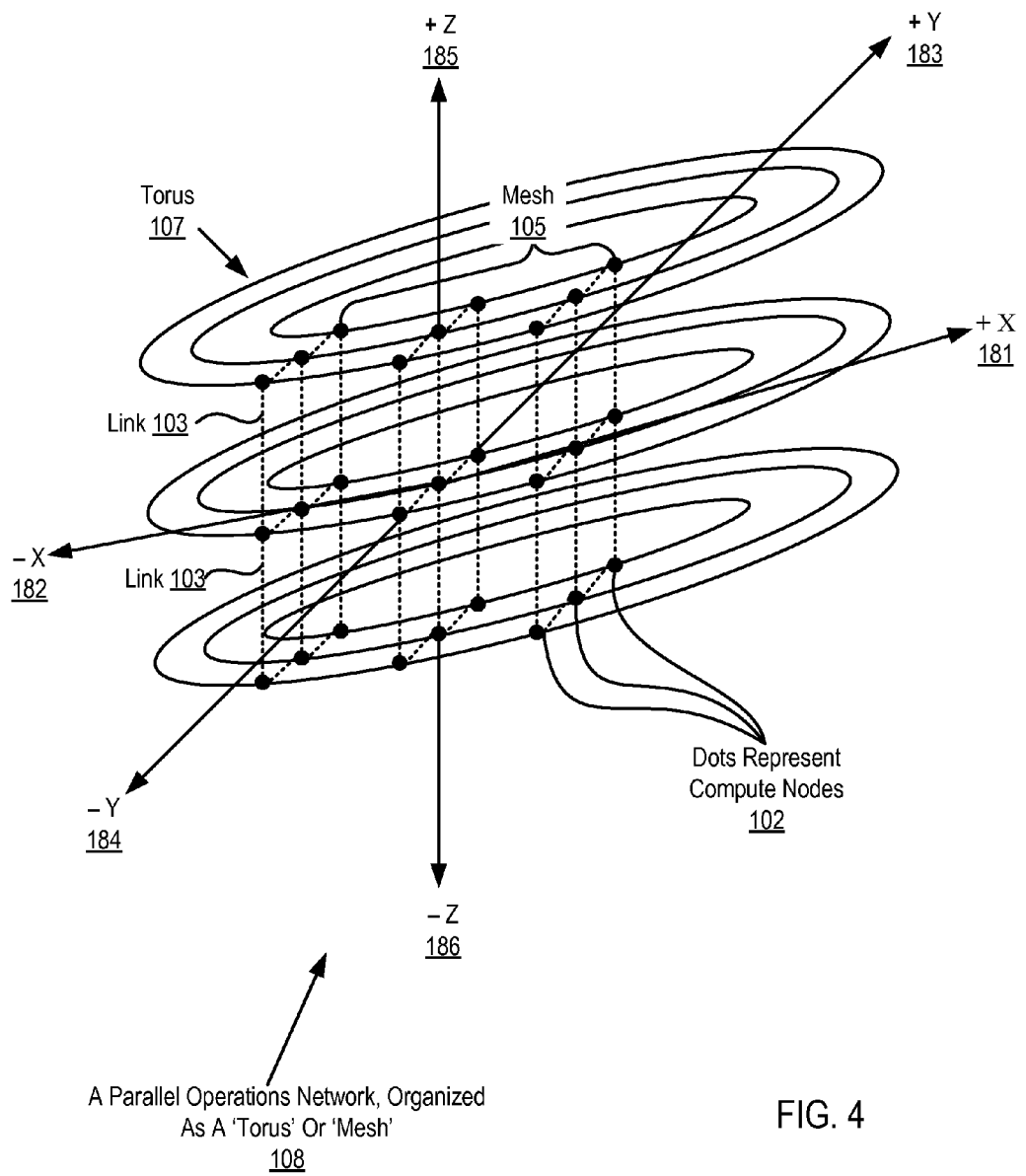
FIG. 4 sets forth a line drawing illustrating an exemplary data communications network optimized for point to point operations useful in systems capable of determining a path for network traffic between a source compute node and a destination compute node in a parallel computer in accordance with embodiments of the present invention.

For further explanation, FIG. 4 sets forth a line drawing illustrating an exemplary data communications network (108) optimized for point to point operations useful in systems capable of determining a path for network traffic between a source compute node and a destination compute node in a parallel computer in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in determining a path for network traffic between a source compute node and a destination compute node in a parallel computer in accordance with embodiments of the present invention may contain only a few compute nodes or may contain thousands of compute nodes.

Figure 5:
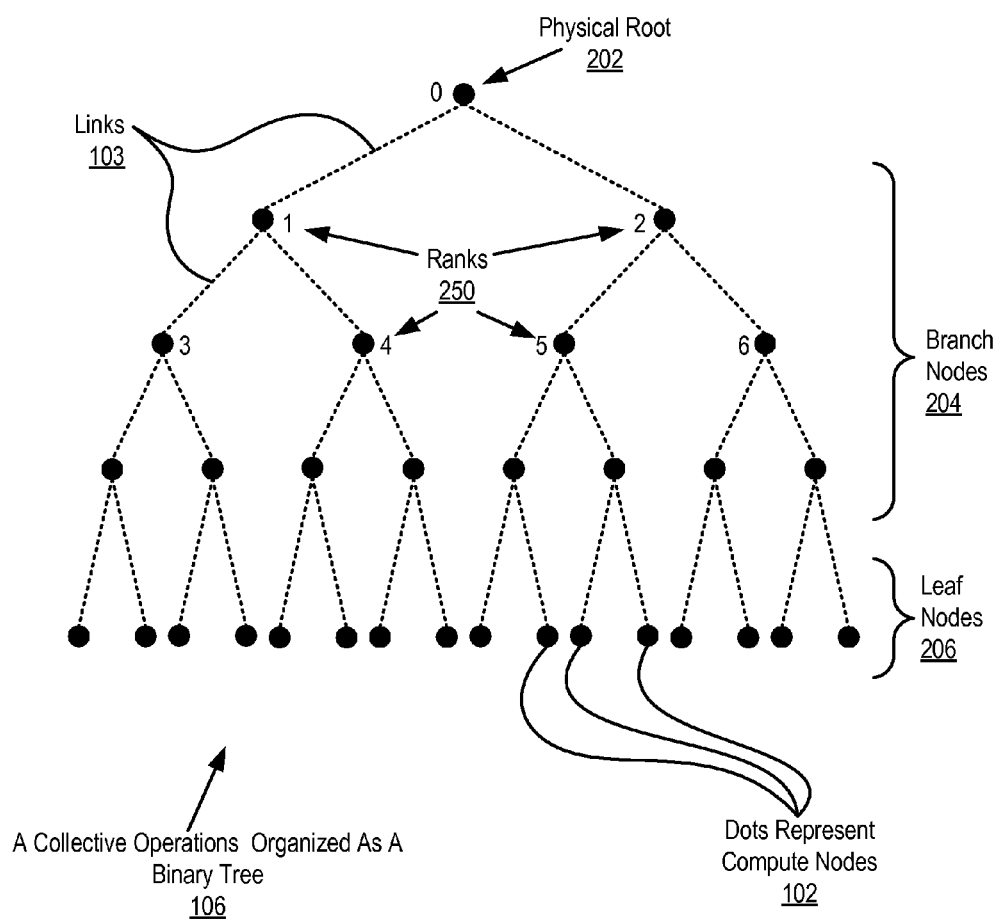
FIG. 5 sets forth a line drawing illustrating an exemplary data communications network optimized for collective operations useful in systems capable of determining a path for network traffic between a source compute node and a destination compute node in a parallel computer in accordance with embodiments of the present invention.

For further explanation, FIG. 5 sets forth a line drawing illustrating an exemplary data communications network (106) optimized for collective operations useful in systems capable of determining a path for network traffic between a source compute node and a destination compute node in a parallel computer in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for determining a path for network traffic between a source compute node and a destination compute node in a parallel computer in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
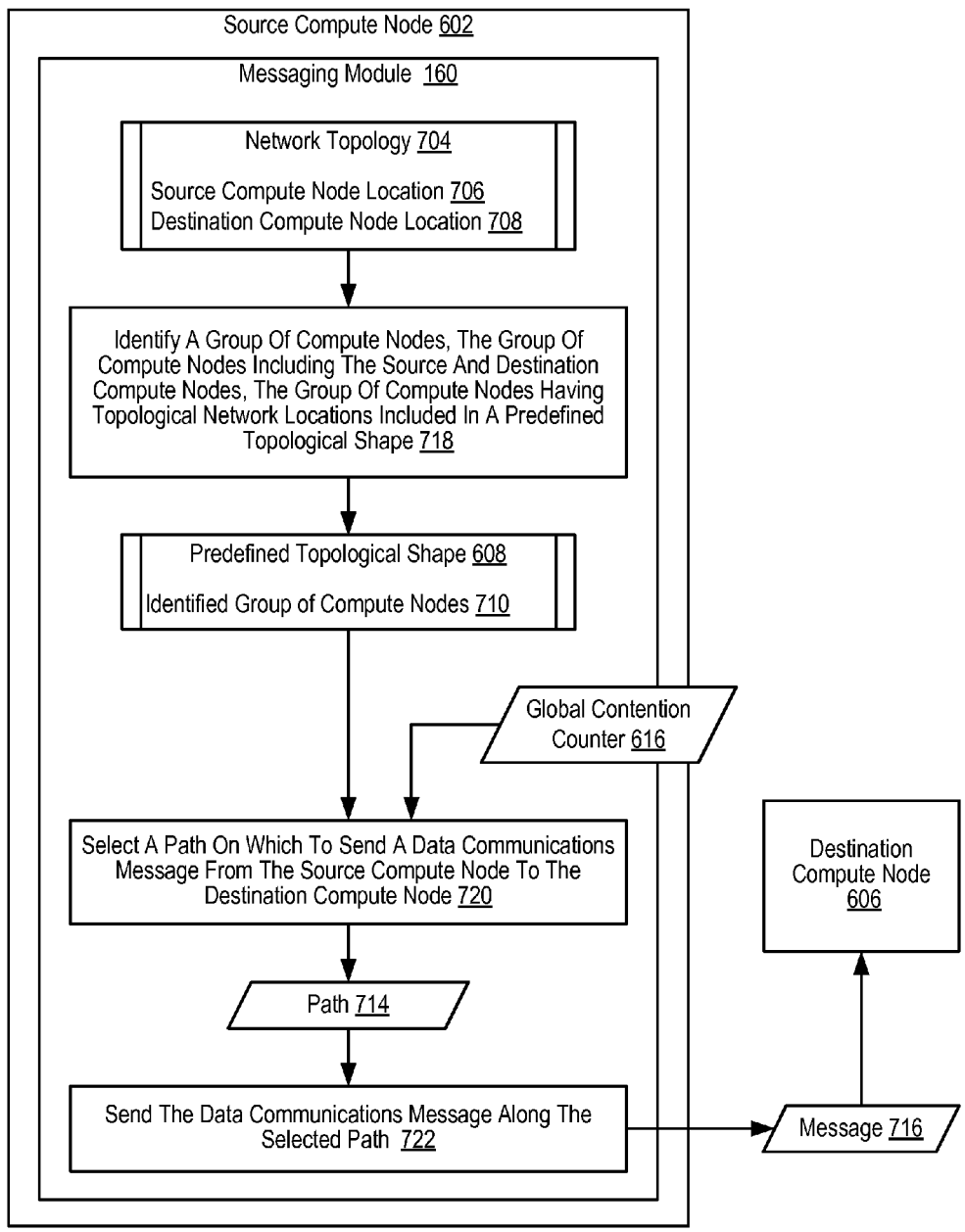
FIG. 6 sets forth a flow chart illustrating an exemplary method for determining a path for network traffic between a source compute node and a destination compute node in a parallel computer according to embodiments of the present invention.

For further explanation, FIG. 6 sets forth a flow chart illustrating an exemplary method for determining a path for network traffic between a source compute node and a destination compute node in a parallel computer according to embodiments of the present invention. In the method of FIG. 6, the source and destination compute nodes are included in an operational group of compute nodes, the compute nodes are connected for data communications in a point to point data communications network, and each compute node is connected in a network topology to an adjacent compute node in the point to point data communications network through a link.

The method of FIG. 6 includes identifying (718), by a messaging module (160) of the source compute node in dependence upon a topological network location (706) of the source compute node (602), a topological network location (708) of the destination compute node (708), and the network topology (704) of the point to point data communications network, a group of compute nodes (710). In the method of FIG. 6, the group of compute nodes (710) includes the source and destination compute nodes. Also in the method of FIG. 6, each compute node in the group of compute nodes (710) has a topological network location included in a predefined topological shape (608) and is capable of receiving and forwarding network traffic thereby creating possible paths for network traffic between the source and destination compute nodes.

Identifying (718), in dependence upon a topological network location (706) of the source compute node (602), a topological network location (708) of the destination compute node (708), and the network topology (704) of the point to point data communications network, a group of compute nodes (710) may be carried out in various ways depending upon the definition of a the predefined topological shape. Consider, for example, a predefined topological shape defined as a rectangular prism.

One way of identifying a group of compute nodes is to identify those compute nodes having network locations within the rectangular prism with the source and compute nodes defining opposite vertices of the rectangular prism.

Figure 7:
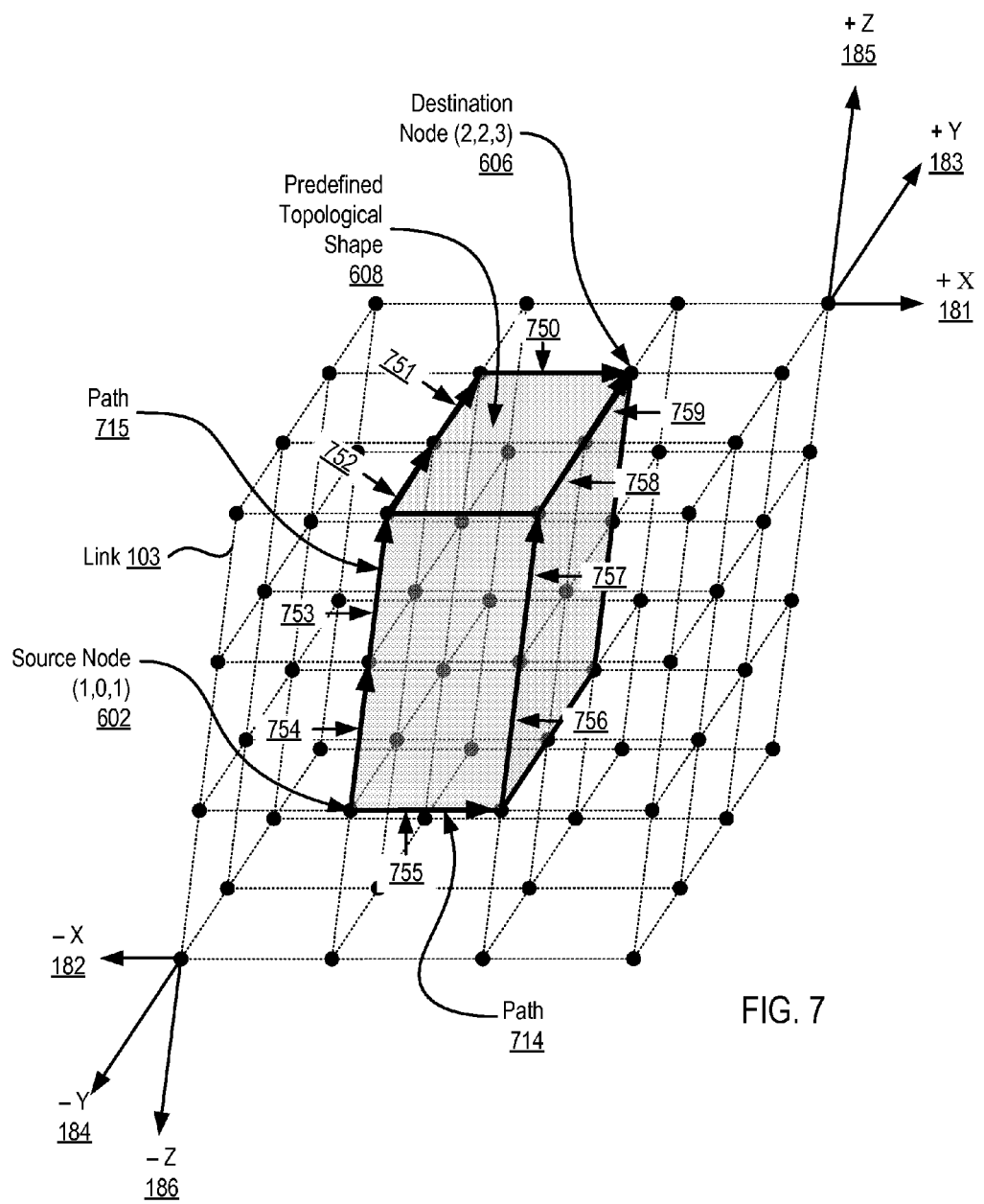
FIG. 7 sets forth a line drawing illustrating an exemplary data communications network optimized for point to point operations and a predefined topological shape useful in systems capable of determining a path for network traffic between a source compute node and a destination compute node in a parallel computer in accordance with embodiments of the present invention.

For further explanation of a predefined topological shape within a network topology, such as a rectangular prism defined by a source and destination compute nodes having network locations at opposing vertices, consider the data communications network illustrated in the example of FIG. 7. FIG. 7 sets forth a line drawing illustrating an exemplary data communications network optimized for point to point operations and a predefined topological shape useful in systems capable of determining a path for network traffic between a source compute node and a destination compute node in a parallel computer in accordance with embodiments of the present invention. The data communications network of FIG. 7 is configured according to network topology of a three dimensional grid. Depicted on the data communications network of FIG. 7 is a predefined topological shape (608) is configured as a rectangular prism. The predefined topological shape (608) is defined by vertices corresponding to locations of compute nodes at the following x,y,z coordinates (1,0,1), (2,0,1), (1,0,3), (2,0,3), (1,2,1), (2,2,1), (1,2,3), and (2,2,3). In addition to the compute nodes located at the vertices of the predefined topological shape, the predefined topological shape (608) of FIG. 7 also includes all compute nodes having topological network locations within the shape and includes the links that connect compute nodes having topological network locations within the shape.

Turning back to the method of FIG. 6, the method also includes selecting (720), from the predefined topological shape (608) by the messaging module (160) of the source compute node (602), in dependence upon a global contention counter (616) stored on the source compute node (602), a path (714) on which to send a data communications message (716) from the source compute node (602) to the destination compute node (606), the so called 'total path.' As mentioned above, the global contention counter (616) represents network contention currently on all links among the compute nodes in the operational group.

In the method of FIG. 6, selecting (720) a path (714) on which to send a data communications message may be carried out in various ways. One way that selecting a path on which to send a data communications message may be carried out, for example, is by determining total contention for each of the possible paths for network traffic between the source and destination compute nodes through compute nodes having topological network locations included in the predefined topological shape and selecting a path having the lowest total contention. Total contention for a path is the sum of network contention for each of link in a particular path.

Consider as an example of selecting a path having the lowest total contention, several possible paths in the exemplary data communications network of FIG. 7 between the source node (602), located at 1,0,1 and the destination node (606), located at 2,2,3. Although many paths within the predefined topological shape exist between the source compute node (602) and the destination compute node (606), consider for this example, only the path (714) and the path (715). Path (715) includes links (750-754) and path (714) includes links (755-459). Table 1 below describes exemplary network contention for each link in path (714) and path (715). The network contention depicted for each link in the exemplary Table 1 is specifically the network contention for a compute node in the direction in which a message would travel from the compute node to the next compute node in the particular path.

TABLE 1

Network Contention For Links In Path (714) and Path (715)

| Path (714) | | Path (715) | |
|---|---|---|---|
| Link | Contention | Link | Contention |
| 755 | 2 | 754 | 3 |
| 756 | 1 | 753 | 2 |
| 757 | 3 | 752 | 3 |
| 758 | 4 | 751 | 4 |
| 759 | 5 | 750 | 6 |

From the exemplary Table 1, the total network contention for path (714), being the sum of each link's individual network contention, is 15. The total network contention for path (715) is 18. Between the two paths, a messaging module may select a path on which to send a data communications message by selecting the path having the lowest total network contention, that is, path (714).

As an alternative to selecting the lowest total network contention determining total contention for each of the possible paths for network traffic between the source and destination compute nodes and selecting a path having the lowest total contention, selecting a path on which to send a data communications message may also be carried out by: determining a maximum single link contention for each of the possible paths for network traffic between the source and destination compute nodes through compute nodes having topological network locations included in the predefined topological shape; and selecting a path having the lowest maximum single link contention. The maximum single link contention for a particular path is the value of network contention for a link in the path having the highest network contention with respect to all other links in the path.

Continuing with the exemplary Table 1 above, path (715) includes a maximum single link contention of 6. Path (714) includes a maximum single link contention of 5. In selecting one of the two paths as the path on which to send a data communications message between the source compute node (602) and destination compute node (606), path (714) may be selected as having the lowest maximum single link contention. Readers of skill in the art will recognize that in some cases the path having the lowest maximum single link contention may not be the path having the lowest total network contention among all other paths.

Another alternative implementation of selecting (720) a path (714) on which to send a data communications message includes identifying paths through compute nodes having topological network locations on outer edges of the predefined topological shape, determining total contention for the identified paths through compute nodes having topological network locations on outer edges of the predefined topological shape, and selecting a path having the lowest total contention. That is, selecting a path may be carried out using only paths that on the edges of the predefined topological shape. As can be seen in the example of FIG. 7, if not constrained to the outer edges, the number of possible paths for network traffic between compute nodes having locations within the predefined topological may be large. Calculating network contention, whether maximum single link or total path contention, for each of the many paths may, in some cases, require an amount of computational overhead so large that the benefit of decreased message latency during transmission provided by using an optimal, less congested network path, is negated. Limiting the number of possible paths for which calculations must be made in order to select a path may drastically reduce such computational overhead while also providing reduced transmission latency of data communications messages between a source and destination compute node. Specifically limiting the number of possible paths to those paths on the outer edges of the predefined topological shape may reduce such computational overhead. In the exemplary data communications network of FIG. 7, for example, the selected path (714) traverses only the outer edges of the rectangular prism forming the predefined topological shape (608).

As an alternative to determining total contention for each path through compute nodes having topological network locations on outer edges of the predefined topological shape, selecting a path on which to send a data communications message may also be carried out by identifying paths through compute nodes having topological network locations on outer edges of the predefined topological shape, determining a maximum single link contention for the identified paths, and selecting a path having the lowest maximum single link contention. That is, as mentioned above with respect to using all possible paths, an outer-edge path may be selected in dependence upon either the lowest total network contention of the path or, in the alternative, the lowest maximum single link contention for a path.

Yet another implementation of selecting a path on which to send a data communications message includes selecting a predefined path to a compute node having a topological network location in a predefined plane within the predefined topological shape as a first part of the path on which to send the data communications message from the source compute node to the destination compute node, hereafter referred to as the 'total path,' and selecting a path from the compute node having a topological network location in the predefined plane within the predefined topological shape to the destination compute node as a second part of the total path. Consider as an example of a predefined plane within the predefined topological shape a plane that bisects a rectangular prism, such as the rectangular prism comprising the predefined topological shape (608) in the example of FIG. 7.

Selecting a path from the compute node having a topological network location in the predefined plane to the destination compute node as a second part of the total path may be carried out by determining total contention for all paths from the compute node having a topological network location in the predefined plane to the destination compute node through compute nodes having topological network locations included in the predefined topological shape and selecting a path having the lowest total contention as described above. As an alternative, selecting a path from the compute node having a topological network location in the predefined plane to the destination compute node as a second part of the total path may also be carried out by determining a maximum single link contention for each path from the compute node having a topological network location in the predefined plane to the destination compute node through compute nodes having topological network locations included in the predefined topological shape and selecting a path having the lowest maximum single link contention as described above.

Returning now to the method of FIG. 6, after selecting (720) the total path on which to send a data communications message from a source compute node to the destination compute node, the method of FIG. 6 continues by sending (722), by the messaging module (160) of the source compute node (602), the data communications message (716) along the selected path (714) for network traffic between the source and destination compute nodes. Sending (722) the data communications message (716) along the selected path (714) may include embedding in a network header of the message, information describing the selected path, so that network communications devices, such as routers, may route the message through compute nodes according to the information describing the selected path.

Exemplary embodiments of the present invention are described largely in the context of a fully functional computer system for determining a path for network traffic between a source compute node and a destination compute node in a parallel computer. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of determining a path for network traffic between a source compute node and a destination compute node in a parallel computer, the source and destination compute nodes included in an operational group of compute nodes, the compute nodes connected for data communications in a point to point data communications network, each compute node connected in a network topology to an adjacent compute node in the point to point data communications network through a link, the method comprising:

identifying a group of compute nodes by a messaging module of the source compute node in dependence upon a topological network location of the source compute node, a topological network location of the destination compute node, and the network topology of the point to point data communications network, wherein the group of compute nodes includes the source and destination compute nodes, each compute node in the group of compute nodes has a topological network location included in a predefined topological shape, and each compute node receive and forward network traffic thereby creating possible paths for network traffic between the source and destination compute nodes;

selecting, from the predefined topological shape by the messaging module of the source compute node, in dependence upon a global contention counter stored on the source compute node, a path on which to send a data communications message from the source compute node to the destination compute node, the global contention counter representing network contention currently on all links among the compute nodes in the operational group; and sending, by the messaging module of the source compute node, the data communications message along the selected path for network traffic between the source and destination compute nodes.

2. The method of claim 1 wherein selecting a path on which to send a data communications message from the source compute node to the destination compute node further comprises:

determining total contention for each of the possible paths for network traffic between the source and destination compute nodes through compute nodes having topological network locations included in the predefined topological shape; and selecting a path having the lowest total contention.

3. The method of claim 1 wherein selecting a path on which to send a data communications message from the source compute node to the destination compute node further comprises:
  determining a maximum single link contention for each of the possible paths for network traffic between the source and destination compute nodes through compute nodes having topological network locations included in the predefined topological shape; and
  selecting a path having the lowest maximum single link contention.

4. The method of claim 1 wherein selecting a path on which to send a data communications message from the source compute node to the destination compute node further comprises:
  identifying paths through compute nodes having topological network locations on outer edges of the predefined topological shape;
  determining total contention for the identified paths through compute nodes having topological network locations on outer edges of the predefined topological shape; and
  selecting a path having the lowest total contention.

5. The method of claim 1 wherein selecting a path on which to send a data communications message from the source compute node to the destination compute node further comprises:
  identifying paths through compute nodes having topological network locations on outer edges of the predefined topological shape;
  determining a maximum single link contention for the identified paths; and
  selecting a path having the lowest maximum single link contention.

6. The method of claim 1 wherein selecting a path on which to send a data communications message from the source compute node to the destination compute node further comprises:
  selecting, as a first part of the path on which to send the data communications message from the source compute node to the destination compute node, a predefined path to a compute node having a topological network location in a predefined plane within the predefined topological shape; and
  selecting, as a second part of the path on which to send the data communications message from the source compute node to the destination compute node, a path from the compute node having a topological network location in the predefined plane within the predefined topological shape to the destination node including:
  determining total contention for all paths from the compute node having a topological network location in the predefined plane to the destination compute node through compute nodes having topological network locations included in the predefined topological shape; and
  selecting a path having the lowest total contention.

7. The method of claim 1 wherein selecting a path on which to send a data communications message from the source compute node to the destination compute node further comprises:
  selecting, as a first part of the path on which to send the data communications message from the source compute node to the destination compute node, a predefined path to a compute node having a topological network location in a predefined plane within the predefined topological shape; and
  selecting, as a second part of the path on which to send the data communications message from the source compute node to the destination compute node, a path from the compute node having a topological network location in the predefined plane within the predefined topological shape to the destination node including:
  determining a maximum single link contention for each path from the compute node having a topological network location in the predefined plane to the destination compute node through compute nodes having topological network locations included in the predefined topological shape; and
  selecting a path having the lowest maximum single link contention.

8. The method of claim 1 wherein the predefined topological shape comprises a rectangular prism.

9. An apparatus for determining a path for network traffic between a source compute node and a destination compute node in a parallel computer, the source and destination compute nodes included in an operational group of compute nodes, the compute nodes connected for data communications in a point to point data communications network, each compute node connected in a network topology to an adjacent compute node in the point to point data communications network through a link, the apparatus comprising a computer processor, a computer memory operatively coupled to the computer processor, the computer memory having computer program instructions performing:
  identifying a group of compute nodes by a messaging module of the source compute node in dependence upon a topological network location of the source compute node, a topological network location of the destination compute node, and the network topology of the point to point data communications network,
  wherein the group of compute nodes includes the source and destination compute nodes, each compute node in the group of compute nodes has a topological network location included in a predefined topological shape, and each compute node receive and forward network traffic thereby creating possible paths for network traffic between the source and destination compute nodes;
  selecting, from the predefined topological shape by the messaging module of the source compute node, in dependence upon a global contention counter stored on the source compute node, a path on which to send a data communications message from the source compute node to the destination compute node, the global contention counter representing network contention currently on all links among the compute nodes in the operational group; and
  sending, by the messaging module of the source compute node, the data communications message along the selected path for network traffic between the source and destination compute nodes.

10. The apparatus of claim 9 wherein selecting a path on which to send a data communications message from the source compute node to the destination compute node further comprises:
  determining total contention for each of the possible paths for network traffic between the source and destination compute nodes through compute nodes having topological network locations included in the predefined topological shape; and
  selecting a path having the lowest total contention.

11. The apparatus of claim 9 wherein selecting a path on which to send a data communications message from the source compute node to the destination compute node further comprises:
  determining a maximum single link contention for each of the possible paths for network traffic between the source and destination compute nodes through compute nodes having topological network locations included in the predefined topological shape; and
  selecting a path having the lowest maximum single link contention.

12. The apparatus of claim 9 wherein selecting a path on which to send a data communications message from the source compute node to the destination compute node further comprises:
  identifying paths through compute nodes having topological network locations on outer edges of the predefined topological shape;
  determining total contention for the identified paths through compute nodes having topological network locations on outer edges of the predefined topological shape; and
  selecting a path having the lowest total contention.

13. The apparatus of claim 9 wherein selecting a path on which to send a data communications message from the source compute node to the destination compute node further comprises:
  identifying paths through compute nodes having topological network locations on outer edges of the predefined topological shape;
  determining a maximum single link contention for the identified paths; and
  selecting a path having the lowest maximum single link contention.

14. The apparatus of claim 9 wherein selecting a path on which to send a data communications message from the source compute node to the destination compute node further comprises:
  selecting, as a first part of the path on which to send the data communications message from the source compute node to the destination compute node, a predefined path to a compute node having a topological network location in a predefined plane within the predefined topological shape; and
  selecting, as a second part of the path on which to send the data communications message from the source compute node to the destination compute node, a path from the compute node having a topological network location in the predefined plane within the predefined topological shape to the destination node including:
  determining total contention for all paths from the compute node having a topological network location in the predefined plane to the destination compute node through compute nodes having topological network locations included in the predefined topological shape; and
  selecting a path having the lowest total contention.

15. The apparatus of claim 9 wherein selecting a path on which to send a data communications message from the source compute node to the destination compute node further comprises:
  selecting, as a first part of the path on which to send the data communications message from the source compute node to the destination compute node, a predefined path to a compute node having a topological network location in a predefined plane within the predefined topological shape; and
  selecting, as a second part of the path on which to send the data communications message from the source compute node to the destination compute node, a path from the compute node having a topological network location in the predefined plane within the predefined topological shape to the destination node including:
  determining a maximum single link contention for each path from the compute node having a topological network location in the predefined plane to the destination compute node through compute nodes having topological network locations included in the predefined topological shape; and
  selecting a path having the lowest maximum single link contention.

16. A computer program product for determining a path for network traffic between a source compute node and a destination compute node in a parallel computer, the source and destination compute nodes included in an operational group of compute nodes, the compute nodes connected for data communications in a point to point data communications network, each compute node connected in a network topology to an adjacent compute node in the point to point data communications network through a link, the computer program product disposed in a computer readable recordable medium, wherein the computer readable recordable medium is not a signal, the computer program product comprising computer program instructions performing:
  identifying a group of compute nodes by a messaging module of the source compute node in dependence upon a topological network location of the source compute node, a topological network location of the destination compute node, and the network topology of the point to point data communications network,
  wherein the group of compute nodes includes the source and destination compute nodes, each compute node in the group of compute nodes has a topological network location included in a predefined topological shape, and each compute node receive and forward network traffic thereby creating possible paths for network traffic between the source and destination compute nodes;
  selecting, from the predefined topological shape by the messaging module of the source compute node, in dependence upon a global contention counter stored on the source compute node, a path on which to send a data communications message from the source compute node to the destination compute node, the global contention counter representing network contention currently on all links among the compute nodes in the operational group; and
  sending, by the messaging module of the source compute node, the data communications message along the selected path for network traffic between the source and destination compute nodes.

17. The computer program product of claim 16 wherein selecting a path on which to send a data communications message from the source compute node to the destination compute node further comprises:
  determining total contention for each of the possible paths for network traffic between the source and destination compute nodes through compute nodes having topological network locations included in the predefined topological shape; and
  selecting a path having the lowest total contention.

18. The computer program product of claim 16 wherein selecting a path on which to send a data communications message from the source compute node to the destination compute node further comprises:

determining a maximum single link contention for each of the possible paths for network traffic between the source and destination compute nodes through compute nodes having topological network locations included in the predefined topological shape; and selecting a path having the lowest maximum single link contention.

19. The computer program product of claim 16 wherein selecting a path on which to send a data communications message from the source compute node to the destination compute node further comprises:

identifying paths through compute nodes having topological network locations on outer edges of the predefined topological shape;

determining total contention for the identified paths through compute nodes having topological network locations on outer edges of the predefined topological shape; and selecting a path having the lowest total contention.

20. The computer program product of claim 16 wherein selecting a path on which to send a data communications message from the source compute node to the destination compute node further comprises:

identifying paths through compute nodes having topological network locations on outer edges of the predefined topological shape;

determining a maximum single link contention for the identified paths; and selecting a path having the lowest maximum single link contention.

* * * * *